US006754642B2

(12) United States Patent
Tadayon et al.

(10) Patent No.: US 6,754,642 B2
(45) Date of Patent: Jun. 22, 2004

(54) METHOD AND APPARATUS FOR DYNAMICALLY ASSIGNING USAGE RIGHTS TO DIGITAL WORKS

(75) Inventors: Bijan Tadayon, Germantown, MD (US); Aram Nahidipour, Mill Creek, WA (US); Xin Wang, Los Angeles, CA (US); Michael C. Raley, Downey, CA (US); Guillermo Lao, Torrance, CA (US); Thanh T. Ta, Huntington Beach, CA (US); Charles P. Gilliam, Darien, CT (US)

(73) Assignee: Contentguard Holdings, Inc., Wilmington, DE (US)

( * ) Notice: Subject to any disclaimer, the term of this patent is extended or adjusted under 35 U.S.C. 154(b) by 327 days.

(21) Appl. No.: 09/867,745

(22) Filed: May 31, 2001

(65) Prior Publication Data

US 2002/0184155 A1 Dec. 5, 2002

(51) Int. Cl.[7] ............................................... G06F 17/60
(52) U.S. Cl. ............................. 705/51; 705/1; 705/51; 705/54
(58) Field of Search ................................. 705/51, 1, 54

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |

(List continued on next page.)

FOREIGN PATENT DOCUMENTS

| | | | | |
|---|---|---|---|---|
| EP | 0 084 441 | | 7/1983 | |
| EP | 0 180 460 | | 5/1986 | |
| EP | 0 332 707 | | 9/1989 | |
| EP | EP 0538453 B | * | 6/1992 | ........... G06F/17/60 |
| EP | EP 0715244 A | * | 11/1994 | ........... G06F/17/60 |
| EP | 0 651 554 | | 5/1995 | |

(List continued on next page.)

OTHER PUBLICATIONS

Crouch, Cameron. "MP3 for Christmas? Maybe"; Nov. 24, 1999. http://www-cgi.cnn.com/TECH/computing/9911/24/mp3.xmas.idg/. Retrieved on,line Sep. 23, 2003.*
PCT International Search Report dated Mar. 20, 2003 (PCT/US02/15200).
"National Semiconductor and EPR Partner for Information Metering/Data Security Cards" Mar. 4, 1994, Press Release from Electronic Publishing Resource, Inc.
Weber, R., "Digital Rights Management Technology" Oct. 1995.

(List continued on next page.)

*Primary Examiner*—James P. Trammell
*Assistant Examiner*—James A. Reagan
(74) *Attorney, Agent, or Firm*—Nixon Peabody, LLP; Marc S. Kaufman

(57) ABSTRACT

Usage rights to digital content are dynamically assigned. Various dynamic conditions are monitored and the usage rights are adjusted in a predetermined manner based on the status of dynamic conditions. The dynamic conditions include the time of day, the load on a server or network, or the like. The resolution of an image can be determined based on the conditions and the image can be rendered using subband decomposition techniques to permit variable resolution images to be constructed on the fly.

32 Claims, 3 Drawing Sheets

U.S. PATENT DOCUMENTS

| | | |
|---|---|---|
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Boebert et al. |
| 4,796,220 A | 1/1989 | Wolfe |
| 4,817,140 A | 3/1989 | Chandra et al. |
| 4,827,508 A | 5/1989 | Shear |
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,715,403 A | 2/1998 | Stefik |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,892,900 A | 4/1999 | Ginter et al. |
| 5,896,176 A | 4/1999 | Das et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,933,498 A | 8/1999 | Schneck et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,047,067 A | 4/2000 | Rosen |
| 6,076,166 A | 6/2000 | Moshfeghi et al. |
| 6,091,777 A | 7/2000 | Guetz et al. |
| 6,112,181 A | 8/2000 | Shear et al. |
| 6,115,471 A | 9/2000 | Oki et al. |
| 6,138,119 A | 10/2000 | Hall et al. |
| 6,157,721 A | 12/2000 | Shear et al. |
| 6,158,010 A | 12/2000 | Moriconi et al. |
| 6,185,683 B1 | 2/2001 | Ginter et al. |
| 6,233,684 B1 | 5/2001 | Stefik et al. |
| 6,236,996 B1 | 5/2001 | Bapat et al. |
| 6,237,786 B1 | 5/2001 | Ginter et al. |
| 6,240,185 B1 | 5/2001 | Van Wie et al. |
| 6,266,618 B1 | 5/2001 | Downs et al. |
| 6,253,193 B1 * | 6/2001 | Ginter et al. .................. 705/57 |
| 6,292,569 B1 | 9/2001 | Shear et al. |
| 6,301,660 B1 | 10/2001 | Benson |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 6,516,052 B2 * | 2/2003 | Voudouris .................... 379/13 |

FOREIGN PATENT DOCUMENTS

| | | |
|---|---|---|
| EP | 0 668 695 | 8/1995 |
| EP | 0 725 376 | 8/1996 |
| GB | 2 136 175 | 9/1984 |
| GB | 2 236 604 | 4/1991 |
| JP | 62-241061 | 10/1987 |
| JP | 64-068835 | 3/1989 |

| | | |
|---|---|---|
| JP | 04-369068 | 12/1992 |
| JP | 05-268415 | 10/1993 |
| JP | 06-175794 | 6/1994 |
| JP | 06-215010 | 8/1994 |
| JP | 07-084852 | 3/1995 |
| JP | 07-200317 | 8/1995 |
| JP | 07-244639 | 9/1995 |
| JP | 0 715 241 | 6/1996 |
| WO | WO 92/20022 | 11/1992 |
| WO | WO 93/01550 | 1/1993 |
| WO | WO 94/01821 | 1/1994 |
| WO | WO 96/24092 | 8/1996 |
| WO | WO 97/48203 | 12/1997 |
| WO | WO 98/11690 | 3/1998 |
| WO | WO 98/42098 | 9/1998 |
| WO | WO 99/49615 | 9/1999 |
| WO | WO 01/63528 | 8/2001 |

OTHER PUBLICATIONS

Flasche, U. et al., "Decentralized Processing of Documents", pp. 119–131, 1986, Comput. & Graphics, vol. 10, No. 2.

Mori, R. et al., "Superdistribution: The Concept and the Architecture", pp. 1133–1146, 1990, The Transactions of the IEICE, vol. E 73, No. 7, Tokyo, JP.

Weber, R., "Metering Technologies for Digital Intellectual Property", pp. 1–29, Oct. 1994, A Report to the International Federation of Reproduction Rights Organizations.

Clark, P.C. et al., "Bits: A Smartcard protected Operating System", pp. 66–70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1–19, Aug. 1992, Corporation for National Research Initiatives, Virginia.

Hilts, P. et al., "Books While U Wait", pp. 48–50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886–0556.

O'Conner, M., "New Distribution Option for Electronic Publishers; iOpener Data Encryption and Metering System for CD–ROM use; Column", pp. 134, Mar. 1994, CD–ROM Professional, vol. 7, No. 2, ISSN: 1409–0833.

Willett, S., "Metered PCs: Is Your System Watching You? Wave System beta test new technology", pp. 84, May 2, 1994, InfoWorld.

Linn, R., "Copyright and Information Services in the Context of the National Research and Education Network ", pp. 9–20, Jan. 1994, IMA Intellectual Property Project Proceedings, vol. 1, Issue 1.

Perrit, Jr., H., "Permission Headers and Contract Law", pp. 27–48, Jan. 1994, IMA Intellectual Property Project Proceedings, vol. 1, Issue 1.

Upthegrove, L., "Intellectual Property Header Descriptors: A Dynamic Approach", pp. 63–66, Jan. 1994, IMA Intellectual Property Proceedings, vol. 1, Issue 1.

Sirbu, M., "Internet Billing Service Design and prototype Implementation", pp. 67–80, Jan. 1994, IMA Intellectual Property Project Proceedings, vol. 1, Issue 1.

Simmel, S. et al., "Metering and Licensing of Resources: Kala's General Purpose Approach", pp. 81–110, Jan. 1994, IMA Intellectual Property Project Proceedings, vol. 1, Issue 1.

Kahn, R., "Deposit, Registration and Recordation in an Electronic Copyright Management System", pp. 111–120, Jan. 1994, IMA Intellectual Property Project Proceedings, vol. 1, Issue 1.

Tygar, J. et al., "Dyad: A System for Using Physically Secure Coprocessors", pp. 121–152, Jan. 1994, IMA Intellectual Property Project Proceedings, vol. 1, Issue 1.

Griswold, G., "A Method for Protecting Copyright on Networks", pp. 169–178, Jan. 1994, IMA Intellectual Property Project Proceedings, vol. 1, Issue 1.

Nelson, T., "A Publishing and Royalty Model for Networked Documents", pp. 257–259, Jan. 1994, IMA Intellectual Property Project Proceedings, vol. 1, Issue 1.

Robinson, E., "Redefining Mobile Computing", pp. 238–240, 247–248 and 252, Jul. 1993, PC Computing.

Abadi, M. et al., "Authentication and Delegation with Smart–cards", 1990, Research Report DEC Systems Research Center.

Mark Stefik, "Letting Loose the Light: Igniting Commerce in Electronic Publication", pp. 219–253, 1996, Internet Dreams: Archetypes, Myths, and Metaphors, IDSN 0–262–19373–6.

Mark Stefik, "Letting Loose the Light: Igniting Commerce in Electronic Publication", pp. 2–35, Feb. 8, 1995, Internet Dreams: Archetypes, Myths, and Metaphors.

Henry H. Perritt, Jr., "Technological Strategies for Protecting Intellectual Property in the Networked Multmedia Enviroment", Apr. 2–3, 1993, Knowbots, permissions Headers & Contract Law.

* cited by examiner

METHOD AND APPARATUS FOR DYNAMICALLY ASSIGNING USAGE RIGHTS TO DIGITAL WORKS

RELATED APPLICATION DATA

This application is related to Applicants' patent applications entitled METHOD AND APPARATUS FOR TRANSFERRING USAGE RIGHTS AND DIGITAL WORK HAVING TRANSFERRABLE USAGE RIGHTS Ser. No. 09/867,746, METHOD AND APPARATUS FOR ESTABLISHING USAGE RIGHTS FOR DIGITAL CONTENT TO BE CREATED IN THE FUTURE Ser. No. 09/867,747, DEMARCATED DIGITAL CONTENT AND METHOD FOR CREATING AND PROCESSING DEMARCATED DIGITAL WORKS Ser. No. 09/867,754, METHOD AND APPARATUS FOR ASSIGNING CONDITIONAL OR CONSEQUENTIAL RIGHTS TO DOCUMENTS AND DOCUMENTS HAVING SUCH RIGHTS Ser. No. 09/867,749, and METHOD AND APPARATUS FOR HIERARCHICAL ASSIGNMENT OF RIGHTS TO DOCUMENTS AND DOCUMENTS HAVING SUCH RIGHTS Ser. No. 09/867,748, which are being filed concurrently herewith, and are incorporated herein by reference in their entirety.

BACKGROUND

This invention relates generally to distribution of digital works and more particularly to digital works having dynamic usage rights.

One of the most important issues impeding the widespread distribution of digital works or documents (i.e. documents in forms readable by computers), via electronic means, and the Internet in particular, is the current lack of ability to enforce the intellectual property rights of content owners during the distribution and use of digital works. Efforts to resolve this problem have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital rights management (DRM)" herein. There are a number of issues to be considered in digital rights management: authentication, authorization, accounting, payment and financial clearing, rights specification, rights verification, rights enforcement, and document protection for example. U.S. Pat. Nos. 5,530,235, 5,634,012, 5,715,403, 5,638,443, and 5,629,980, the disclosures of which are incorporated herein by reference, disclose DRM concepts addressing these issues.

In the world of printed documents, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is far too easy to copy, modify, and redistribute unprotected digital works. Accordingly, some method of protecting digital works is necessary to make it more difficult to copy them without authorization.

Unfortunately, it has been widely recognized that it is difficult to prevent, or even deter people from making unauthorized distributions of electronic works within current general-purpose computing and communications systems such as personal computers, workstations, and other devices connected over communications networks, such as local area networks (LANs), intranets, and the Internet. Many attempts to provide hardware-based solutions to prevent unauthorized copying have proven to be unsuccessful. The proliferation of high band-width "broadband" communications technologies will render it even more convenient to distribute large documents electronically, including video files such as full length motion pictures, and thus will remove any remaining deterrents to unauthorized distribution of digital works. Accordingly, DRM technologies are becoming a high priority.

Two basic DRM schemes have been employed to attempt to solve the document protection problem: secure containers and trusted systems. A "secure container" (or simply an encrypted document) offers a way to keep document contents encrypted until a set of authorization conditions are met and some copyright terms are honored (e.g., payment for use). After the various conditions and terms are verified with the document provider, the document is released to the user in clear form. Commercial products such as IBM's CRYPTOLOPES and InterTrust's DIGIBOXES fall into this category. Clearly, the secure container approach provides a solution to protecting the document during delivery over insecure channels, but does not provide any mechanism to prevent legitimate users from obtaining the clear document and then using and redistributing it in violation of content owners' intellectual property.

Cryptographic mechanisms are typically used to encrypt (or "encipher") documents that are then distributed and stored publicly, and ultimately privately deciphered by authorized users. This provides a basic form of protection during document delivery from a document distributor to an intended user over a public network, as well as during document storage on an insecure medium.

In the "trusted system" approach, the entire system is responsible for preventing unauthorized use and distribution of the document. Building a trusted system usually entails introducing new hardware such as a secure processor, secure storage and secure rendering devices. This also requires that all software applications that run on trusted systems be certified to be trusted. While building tamper-proof trusted systems is a real challenge to existing technologies, current market trends suggest that open and untrusted systems such as PC's and workstations using browsers to access the Web, will be the dominant systems used to access digital works. In this sense, existing computing environments such as PCs and workstations equipped with popular operating systems (e.g., Windows™, Linux™, and UNIX) and rendering applications such as browsers are not trusted systems and cannot be made trusted without significantly altering their architectures. Of course, alteration of the architecture defeats a primary purpose of the Web, i.e. flexibility and compatibility.

U.S. Pat. No. 5,634,012, the disclosure of which is incorporated herein by reference, discloses a system for controlling the distribution of digital documents. Each rendering device has a repository associated therewith. A predetermined set of usage transaction steps define a protocol used by the repositories for carrying out usage rights associated with a document. Usage rights are encapsulated with the document content or otherwise associated with the document to travel with the document. The usage rights can permit various types of use such as, viewing only, use once, distribution, and the like. Rights can be granted based on payment or other conditions and are generally set prior to distribution to the user. For example the rights may grant the user certain privileges, such as the ability to view and print the content, in exchange for a specific fee. However, there are dynamic conditions that affect the cost or desirability of distributing a document. Conventional DRM techniques do not account for such dynamic conditions.

SUMMARY OF THE INVENTION

A first aspect of the invention is a method of dynamically assigning usage rights to digital content comprising storing the digital content on computer readable media, associating usage rights with the digital content, determining the status of one or more dynamic conditions, and adjusting the usage rights in a predetermined manner based on the status of the dynamic conditions.

A second aspect of the invention is computer readable media having instructions for dynamically assigning usage rights to digital content including instructions for determining the status of one or more dynamic conditions and instructions for adjusting the usage rights in a predetermined manner based on the status of dynamic conditions.

BRIEF DESCRIPTION OF THE DRAWING

The invention is described through a preferred embodiment and the attached drawing in which.

DETAILED DESCRIPTION

Figure 1:
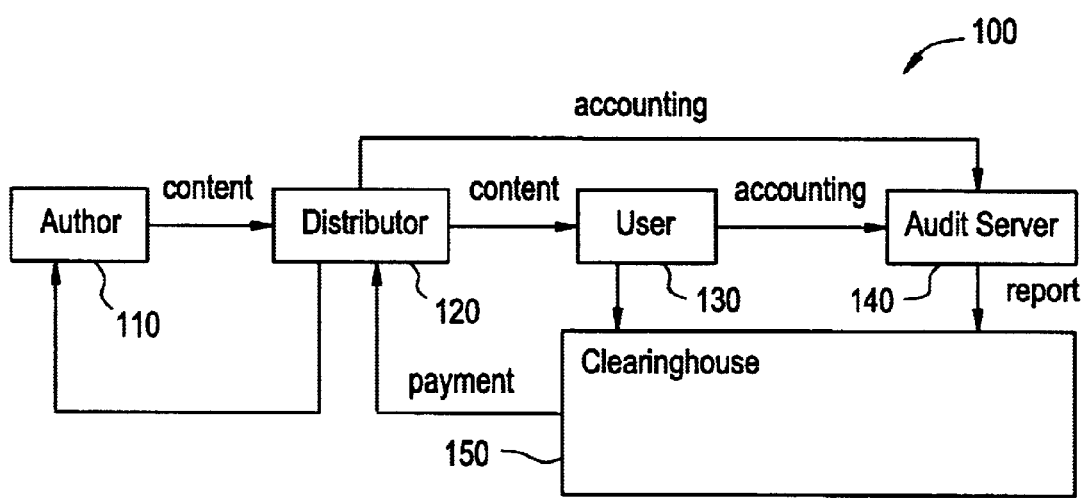
FIG. 1 is a schematic illustration of a digital content distribution system that can be used with the preferred embodiment.

FIG. 1 is a block diagram of a system for the electronic distribution of digital works in accordance with a preferred embodiment. Such works may include correspondence, books, magazines, journals, newspapers, other papers, software, audio and video clips, other files or objects, and the like. The phrase "digital work" as used herein refers to any type of element having content in computer readable form. "Content" as used herein refers to the viewable or otherwise usable portion of a digital work. Author 110 creates original content 112 and passes it to a distributor 120 for distribution. Ordinarily, author 110 is the creator of the content. However, the term "author" as used herein can be the creator, owner, editor, or other entity controlling the content or an agent (e.g. a publisher) of one of those entities. Also author 110 may distribute documents directly, without involving another party as distributor 120 and thus the author and distributor may be the same entity. However, the division of functions set forth in FIG. 1 is more efficient, as it allows author 110 to concentrate on content creation and not the administrative functions of distribution. Moreover, such a breakdown facilitates economies of scale by permitting distributor 120 to associate with a number of authors 110. Distributor 120 distributes digital works to user 130 upon request. In a typical electronic distribution model, the work is distributed as a document containing the content and associated usage rights in encrypted form. Distributor 120 encrypts the works with a random key and then encrypts the random key with a public key corresponding to user 130. Thus the encrypted work is customized solely for the particular user 130. User 130 is then able to use their private key to unencrypt the random key and use it to unencrypt and view the content at the work.

Payment for the work is passed from user 130 to distributor 120 by way of clearinghouse 150 which collects requests from user 130 and from other users who wish to sue a particular content. Clearinghouse 150 also collects payment information, such as debit transactions, credit card transactions, or other known electronic payment schemes, and forwards the collected payments as a payment batch to distributor 120. Of course, clearinghouse 150 may retain a share of the payment as a fee for the above-noted services. Distributor 120 may retain a portion of the batch payment from clearinghouse 150 for distribution services and forward a payment (for example royalties) to author 110. Distributor 120 may compile a bundle or batch of user requests for a single work before distributing the work. In such a case, a single instance of the encrypted work can be generated for unencryption by all of the requesting users 130.

Each time user 130 requests (or uses) content of a work, an accounting message is sent to audit server 140 which ensures that each request by user 130 matches with a document sent to user 130 by distributor 120. Accounting information is received by audit server 140 directly from distributor 120. Any inconsistencies are transmitted via a report to clearinghouse 150, which can then adjust the payment batches made to distributor 120 accordingly. This accounting scheme is operative to reduce the possibility of fraud in electronic distribution and to handle any time-dependent usage rights that may result in charges that vary, depending on the duration or other extent of use.

Figure 2:
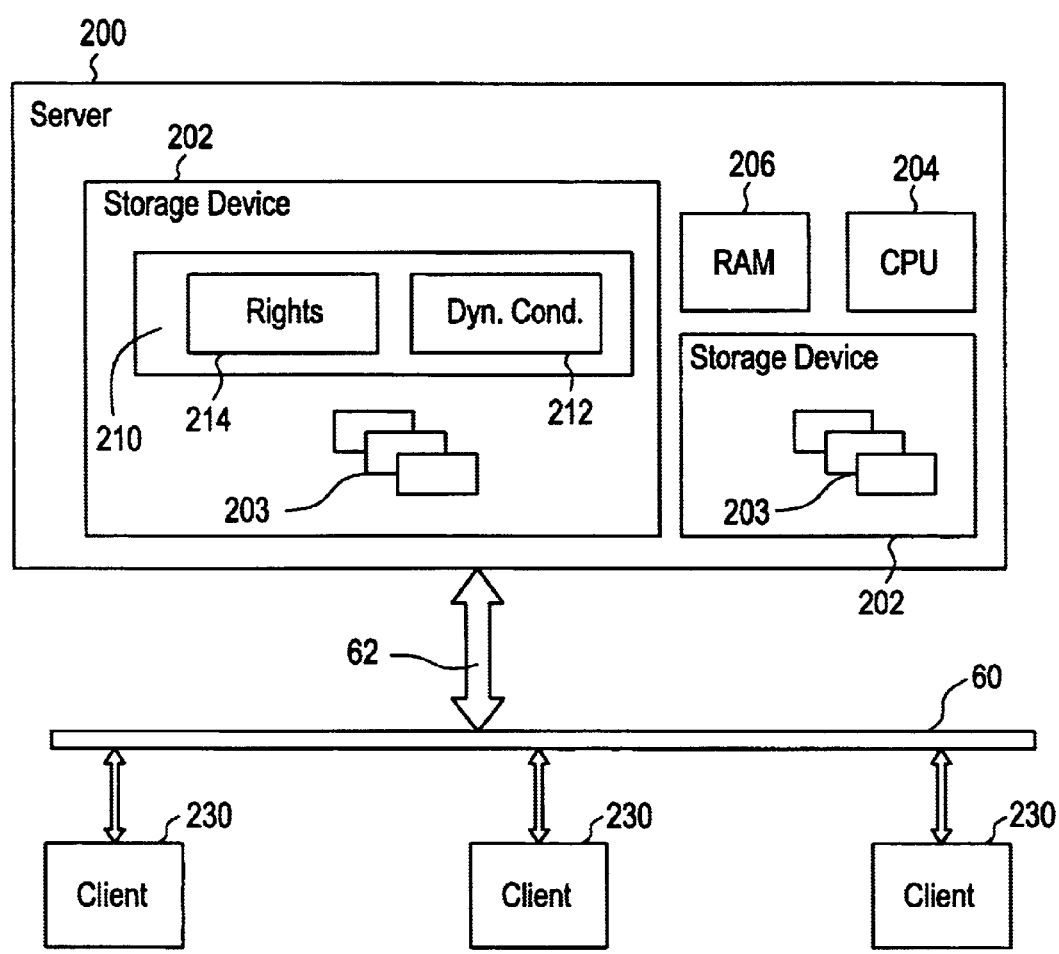
FIG. 2 is a block diagram of a computer architecture in accordance with the preferred embodiment.

FIG. 2 illustrates a computer architecture for downloading digital works from distributor 120 to user 130 in accordance with the preferred embodiment. The architecture utilizes a communications network, such as the Internet, for data transfer. User 130 uses client computer 230, such as a personal computer, a personal digital assistant (PDA), a data terminal, a kiosk, or the like, to communicate with computer server 200 associated with distribution 120. Client 230 is coupled to Internet backbone 60, through a modem, phone line and Internet Service Provider (ISP) for example, in a known manner. Client can be running an operating system having a graphical user interface (GUI) such as Microsoft Windows 98™ or Microsoft Windows 2000™ and an application program known as a "Web browser" that permits a graphical user interface to be used to control communications over the Internet through Hypertext Transfer Protocol (HTTP) and a standard page description language known as Hypertext Markup Language (HTML). The collection of Internet servers using HTTP is known as the "World Wide Web" or the "Web".

Server 200 is associated with distributor 120 and can be a personal computer, a server, a minicomputer, a collection of computers, a computer network, or the like. Server 200 has storage devices 202 (such as magnetic hard discs) for storing information including central program 710 and digital works 203. Central processing unit (CPU) 204 for controlling the flow of information in accordance with control program 210, and random access memory (RAM) 206 used as a workspace for CPU 204. Server 200 is coupled to Internet backbone 60 through high speed communications link 62. Of course, server 200 can be coupled to Internet backbone 60 through a modem and an ISP in a manner similar to client 230, or in any other manner.

Control program 210 is stored in one of storage devices 202 and includes dynamic conditions module 212 which tracks a plurality of dynamic conditions. Control program 210 also includes rights module 214 which sets usage rights for content in accordance with the dynamic conditions monitored by dynamic conditions module 212. One such dynamic condition can be the time of day. For example, a user can access a popular web site to obtain content during off-peak hours, in terms of web site traffic, at a reduced fee. To encourage content distribution during off-peak hours (and more uniform distribution of traffic to server 200), distributor 120 can charge lower fees for the same content during off-peak hours by monitoring time with dynamic conditions module 212 (which can reference the real time clock of server 200) and setting usage rights in a dynamic manner with rights module 214 based on the conditions, i.e. the time. The usage rights can be assigned in any known manner, such as through techniques disclosed in the patents cited above and incorporated by reference.

Figures 3, 4:
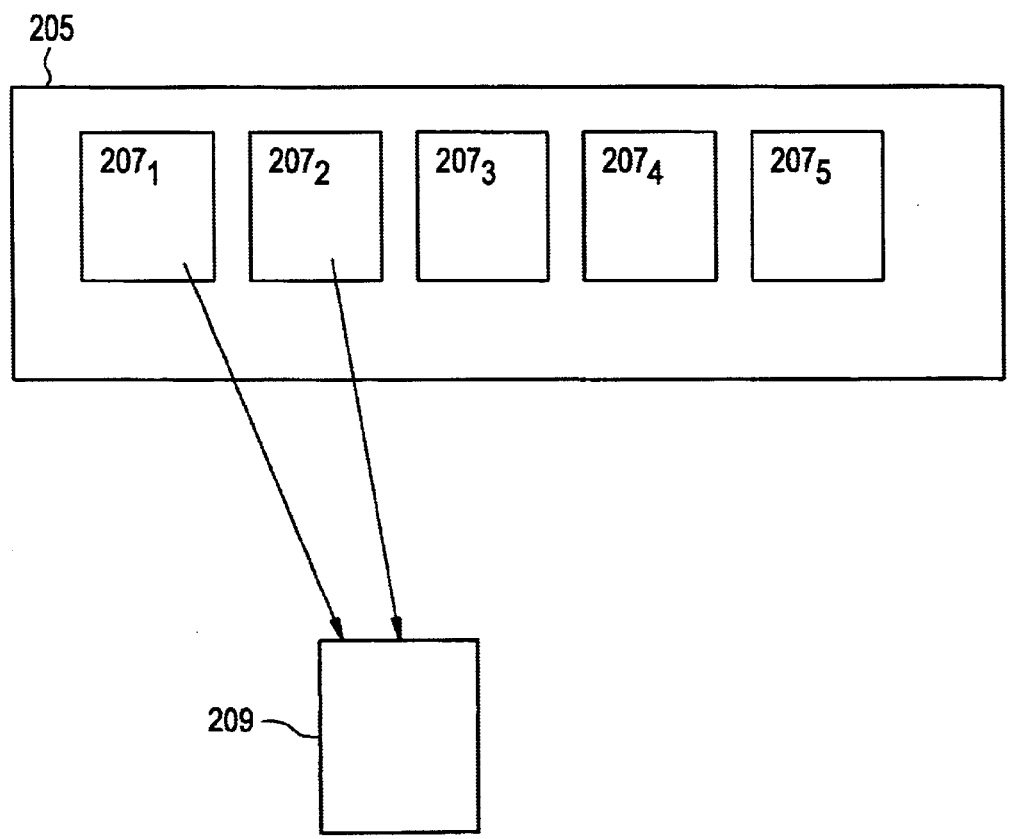
FIG. 3 is a lookup table illustrating the logic of the rights module of the preferred embodiment.
FIG. 4 is a block diagram illustrating how image resolution is varied in the preferred embodiment.

FIG. 3 illustrates a simple example of the logic of rights module 214 in the form of a lookup table. Conditions values 216 are listed in the left column and corresponding usage rights 218 are listed in the right column. As an example, assume that condition value A corresponds to 9 am to 5 pm in the United States Eastern Standard Time, condition value B corresponds to 5 pm to 11 pm in the United States Pacific Standard Time, and condition value C corresponds to 11 pm to 9 am in the United States Eastern Standard Time. In this case, the corresponding usage rights 218 can be fees or discounts off of standard fees. Assuming that server 200 tends to be most busy during time A and least busy during time C, price X can be higher than price Y, which is higher than price Z. Of course, if X, Y, and Z are expressed as discounts, the inverse relationship can be true, i.e. Z can be higher than Y, which is higher than X. Usage rights 218 can be assigned to one or more of digital works 203 on a periodic basis, just prior to distribution, or in any manner.

The fee schedule, or other usage rights can be dynamically adjusted based on the status of the network in general or server in particular, by obtaining various known load parameters from the network. Of course, in such a case, rights module 214 may have a more complex lookup table or other logic that combines the various conditions to ascertain corresponding usage rights 218 for content. Also, dynamic conditions module 212 can include known software tools for monitoring servers load such as WEB PERFORMANCE TRAINER™, a commercially available software package for monitoring server load.

The concept of dynamic usage rights can apply to fees or any other rights. In other words, any usage rights that can be specified for a digital work can be changed based on dynamic conditions. For example, the ability to print or distribute the content, the number of times the content can be used, the resolution of an image in the content, and the like can all be set and changed based on dynamic conditions. The list of usage rights can include all rights that can be specified by the known XrML™ usage rights language or other grammars for digital rights management. The logic of usage rights module 214 can be based on curves, formulas, tables, databases or any other algorithm using predetermined, or dynamic schemes.

Further, the percentage of the commission or fee of distributor 120 can be a usage right that is varied dynamically. For example, depending on the network conditions or parameters (such as number of the visitors to the web site or corresponding downloads at that moment), to encourage more uniform distribution of content throughout all hours, distributor 120 can charge a lower percentage during times of lower use of server 200. This permits distributor 120 to reduce the number of servers in the server farm that constitutes server 200 and thus reduce operating costs.

Further, the quality or other characteristics of content can be adjusted as usage rights based on dynamic conditions. For example, at peak hours, user 130 may only be able to download a low resolution image of content, or may be charged a premium for a high resolution image. In such a case, it is desirable to make content available in plurality of resolutions. However, storing multiple resolution images (at each desired resolution) for each piece of content can be very cumbersome and can take up a large amount of memory in memory devices 202 and other resources. Applicant has discovered that application of known wavelet decomposition or other subband decomposition technologies can be used to provide flexibility of resolution while reducing resource overhead.

The phrase "wavelet decomposition" refers to a method of signal processing in which the signal is divided, i.e. decomposed, into components of various frequency bandwidths. Wavelet decomposition and related transformations are well known generally and described in Wavelets and Subband Coding, M. Veterrli and J. Kovacevic, Prentice Hall, 1995 the disclosure of which is incorporated herein by reference. Wavelet decomposition has been applied to analyzing the time-frequency domain of various signals and to digital compression technologies. FIG. 4 illustrates one of digital works 203 adapted for providing variable resolution images in accordance with the preferred embodiment. Content of work 203, in the form of an image, is divided into sub-images $207_1$–$207_5$. Each sub-image corresponds to a wavelet, i.e. a frequency component of the image. In the preferred embodiment, sub-image $207_1$ is a ½ resolution image, sub-image $207_2$ is a ¼ resolution image, sub-image $207_3$ is a ⅛ resolution image, sub-image $207_4$ is a 1/16 resolution image and sub-image $207_5$ is a 1/32 resolution image. Each of sub-images $207_1$–$207_5$ can be superposed and downloaded to provide a plurality of possible resolutions. For example, downloading only sub-image $207_1$ provides a ½ resolution image. However, superposing sub-image $207_1$ with sub-image $207_2$ provides a higher resolution image 209. Accordingly, usage rights X, Y, and Z of FIG. 3 can correspond to the right to download various sub-images or combinations thereof.

The parameters used in sub-sampling (or filtering) of content determine the quality of the resultant sub-image and can be varied in a known manner to make any number of sub-images having any resolution. Further, while the sub-images $207_1$–$207_5$ are all illustrated in FIG. 4, all sub-images need not be decomposed and stored but can be decomposed "on the fly" using known mathematical techniques in control program 210 to provide only sub-images needed for the desired resolution download. The content owner may grant only the right to view, print, or copy a wavelet decomposition low resolution sub-image for trial or inspection purposes, for example. All the sub-images can be attached to the corresponding content for usage rights assignment or can be generated on the fly. In the preferred embodiment, all of the components of the image are in the same package, and the resolutions or the combination of resolutions are readily obtainable using wavelet decomposition. The various rights and the associated content can be stored at the same location or at different locations.

The invention can be applied to any type of distribution system for digital works. For example any number of computers or other devices can be used. Any dynamic conditions can be monitored and used to change usage rights assigned to content in any manner. Usage rights can be any privileges or restrictions on use and/or distribution of the digital work or content thereof. The dynamic conditions can be monitored, and the usage rights can be dynamically assigned or adjusted, constantly, periodically, or only when a digital work is to be distributed.

The distribution, accounting, and other functions of the distributor and clearinghouse can be accomplished by any party on any device. For example, the content can be rendered on an ebook reader or PDA in response to entry of a code or insertion of a smartcard into a reader and accounting can be accomplished when the digital work or accounting data is returned to a specific source. The division of tasks disclosed herein is only an example. Usage rights and or accounting data can be encapsulated with the digital work or can be stored separately. Code for rendering, decrypting, or otherwise permitting or limiting use of the content can be stored on any device or can be encapsulated with the digital work. Any distribution arrangement can be used with the invention and such arrangements can include any combination of devices, such as personal computers, servers, PDAs, and the like communicating with one another in any manner as is necessary to transfer the desired information.

The invention has been described through a preferred embodiment. However, various modifications can be made without departing from the scope of the invention as defined by the appended claims and legal equivalents.

What is claimed:

1. A method of dynamically assigning usage rights to digital content comprising:
    storing the digital content on computer media;
    associating a usage right with the digital content, said usage right specifying the type of use for which authorized users can use the digital content and being enforceable by a repository;
    determining the status of one or more dynamic conditions that are external to said usage right; and
    adjusting said usage right in a predetermined manner based on the status of said dynamic conditions determined in said determining step.

2. A method as recited in claim 1, wherein said adjusting step comprises adjusting the resolution of a processed image of the content that is available for use by a user.

3. A method as recited in claim 2, wherein said adjusting step comprises determining a resolution for download of the content, applying a subband decomposition algorithm to the content to create at least one sub-image, and combining sub-images created in said applying step into the processed image.

4. A method as recited in claim 1 wherein said determining step comprises determining the time of day.

5. A method as recited in claim 1 wherein said determining step comprises determining the load on a computer system used to distribute the digital content.

6. A method as recited in claim 1 wherein said adjusting step comprises adjusting a fee charged for the digital content.

7. A method as recited in claim 1 wherein said adjusting step comprises adjusting a distribution right for the digital content.

8. A method as recited in claim 1, wherein the digital content is a digital image, and the type of use is a resolution of the digital image to which a user is entitled, and said adjusting step comprises adjusting the resolution to which the user is entitled, said method further comprising:
    applying a subband decomposition algorithm to the image to create plural sub-images of predetermined resolutions; and
    combining sub-images created in said applying step into a processed image having the resolution to which the user is entitled as adjusted in said adjusting step.

9. A method as recited in claim 8 wherein said applying step comprises applying a wavelet decomposition algorithm to the image.

10. Computer readable media having instructions for dynamically assigning a usage right to digital content, said usage right specifying the type of use for which authorized users can use the digital content and being enforceable by a repository, said media comprising;
    instructions for determining the status of one or more dynamic conditions that are external to said usage right; and
    instructions for adjusting the usage rights in a predetermined manner based on the status of said dynamic conditions.

11. Computer readable media as recited in claim 10, wherein said instructions for adjusting comprise instructions for adjusting the resolution of a processed image of the content that is available for use by a user.

12. Computer readable media as recited in claim 11, wherein said instructions for adjusting comprise instructions for determining a resolution for download of the content, instructions for applying a subband decomposition algorithm to the content to create at least one sub-image, and instructions for combining sub-images into the processed image.

13. Computer readable media as recited in claim 10 wherein said instructions for determining comprise instructions for determining the time of day.

14. Computer readable media as recited in claim 10 wherein said instructions for determining comprise instructions for determining the load on a computer system used to distribute the digital content.

15. Computer readable media as recited in claim 10 wherein said instructions for adjusting comprise instructions for adjusting a fee charged for the digital content.

16. Computer readable media as recited in claim 10 wherein said instructions for adjusting comprise instructions for adjusting a distribution right for the digital content.

17. A method as recited in claim 1, wherein the type of use specified by the usage rights is at least one of the ability to print the content, the ability to distribute the content, the number of times the content can be used, and the resolution of an image of the content, and wherein said adjusting step comprises adjusting said at least one of the ability to print the content, the ability to distribute the content, the number of times the content can be used, and the resolution of an image of the content subsequent to said associating step.

18. A computer readable media as recited in claim 10, wherein the type of use specified by the usage rights is at least one of the ability to print the content, the ability to distribute the content, the number of times the content can be used, and the resolution of an image of the content, and wherein said instructions for adjusting comprise instructions for adjusting said at least one of the ability to print the content, the ability to distribute the content, the number of times the content can be used, and the resolution of an image of the content subsequent to the usage rights being associated with the content.

19. A method as recited in claim 1, wherein the digital content comprises textual content.

20. A method as recited in claim 1, wherein the digital content comprises audio content.

21. A method as recited in claim 1, wherein the digital content comprises video content.

22. A method as recited in claim 1, wherein the digital content comprises software.

23. Computer readable media as recited in claim 10, wherein the digital content comprises textual content.

24. Computer readable media as recited in claim 10, wherein the digital content comprises audio content.

25. Computer readable media as recited in claim 10, wherein the digital content comprises video content.

26. Computer readable media as recited in claim 10, wherein the digital content comprises software.

27. A method as recited in claim 1, wherein said determining step is conducted continuously.

28. A method as recited in claim 1, wherein said determining step is conducted periodically.

29. A method as recited in claim 1, wherein said determining step is conducted at the time of distribution of the digital content.

30. Computer readable media as recited in claim 10, wherein said instructions for determining comprise instructions for determining the status of one or more dynamic conditions continuously.

31. Computer readable media as recited in claim 10, wherein said instructions for determining comprise instructions for determining the status of one or more dynamic conditions periodically.

32. Computer readable media as recited in claim 10, wherein said instructions for determining comprise instructions for determining the status of one or more dynamic conditions at the time of distribution of the digital content.

* * * * *